(12) United States Patent
Bombardo

(10) Patent No.: US 9,303,738 B1
(45) Date of Patent: Apr. 5, 2016

(54) ARRANGEMENT AND METHOD FOR GUIDING A LOAD IN A LINEAR MOVEMENT

(71) Applicant: James Bombardo, Elko, MN (US)

(72) Inventor: James Bombardo, Elko, MN (US)

(*) Notice: Subject to any disclaimer, the term of this patent is extended or adjusted under 35 U.S.C. 154(b) by 38 days.

(21) Appl. No.: 14/145,369

(22) Filed: Dec. 31, 2013

(51) Int. Cl.
*F16H 25/12* (2006.01)
*F16H 25/20* (2006.01)

(52) U.S. Cl.
CPC ........................... *F16H 25/12* (2013.01)

(58) Field of Classification Search
CPC . F16H 25/12; F16H 25/02; F16H 2025/2034; F16H 25/2003; F16H 25/2018; F16H 2025/204; F16H 2025/249; F16H 2025/2481; F16H 25/2418; F16H 29/088; F16C 29/0688; F16C 29/069; F16C 29/005; F16C 29/004; F16C 29/0602; F16C 29/063; F16C 29/0633; F16C 29/0635; F16C 29/084; F16C 29/086; F16B 37/0842
USPC .......... 74/89.33, 89.32, 89.34, 89.23; 384/43, 384/44, 45, 15, 55, 59; 411/437
See application file for complete search history.

(56) References Cited

U.S. PATENT DOCUMENTS

| | | | | |
|---|---|---|---|---|
| 1,405,342 | A * | 1/1922 | Shaffer | F16D 1/08 403/344 |
| 4,715,241 | A * | 12/1987 | Lipinski et al. | 74/89.31 |
| 4,953,418 | A * | 9/1990 | Hirose | 74/89.32 |
| 5,388,475 | A * | 2/1995 | Shear, III | F16H 25/2223 264/267 |
| 5,704,249 | A * | 1/1998 | Krauska | A47C 20/042 403/366 |
| 5,852,949 | A * | 12/1998 | Cartensen | 74/424.94 |
| 6,880,417 | B2 * | 4/2005 | Nagai et al. | 74/89.36 |
| 7,219,570 | B2 * | 5/2007 | Erikson et al. | 74/89.42 |
| 7,258,519 | B2 * | 8/2007 | Shimizu | 411/433 |
| 7,614,790 | B2 * | 11/2009 | Liu et al. | 384/13 |
| 8,800,402 | B2 * | 8/2014 | Weum | E05B 47/00 70/275 |
| 8,967,006 | B2 * | 3/2015 | Pettersson | 74/89.27 |
| 2002/0012577 | A1 * | 1/2002 | Grant | 411/87 |
| 2004/0076349 | A1 * | 4/2004 | Fujimura | 384/43 |
| 2007/0237437 | A1 * | 10/2007 | Lee et al. | 384/45 |
| 2010/0074564 | A1 * | 3/2010 | Geka et al. | 384/15 |
| 2010/0108843 | A1 * | 5/2010 | Shaffer | 248/274.1 |

* cited by examiner

*Primary Examiner* — William Kelleher
*Assistant Examiner* — Jude Agendia
(74) *Attorney, Agent, or Firm* — Dave Alan Lingbeck

(57) ABSTRACT

An arrangement and method for guiding a load in a linear movement for providing stability and properties of low inertia. The arrangement and method for guiding a load in a linear movement includes a rail being a solid body having a top and opposed sides each interconnecting the top; a shaft being movable upon the rail; and a carrier assembly being movable with the shaft upon the rail.

12 Claims, 4 Drawing Sheets

ARRANGEMENT AND METHOD FOR GUIDING A LOAD IN A LINEAR MOVEMENT

BACKGROUND OF THE INVENTION

1. Field of the Invention

The present invention relates to linear guide-ways and more particularly pertains to a new arrangement and method for guiding load in a linear movement for providing stability and properties of low inertia.

2. Description of the Prior Art

The use of linear guide-ways is known in the prior art. More specifically, linear guide-ways heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a circulating system for a linear guide way comprising a slide block, a slide rail, two cover plates, two end caps and plural rolling elements. The slide block is disposed on the slide rail. The two cover plates and the two end caps are disposed at two opposite ends of the slide block, respectively. Another prior art includes a dust proof device used with a linear guide apparatus including a strap-shaped plate fixed to the upper surface of a guide rail throughout the whole length of the guide rail to cover the openings of through holes used for inserting bolts which secure the guide rail to a base. Also, another prior art includes a self-lubricating ball screw comprising a nut, a screw shaft, at least one lubricating unit and at least one external oil tank. Further, another prior art includes a linear roller guide unit comprising an elongated rail and a carrier straddling the rail. A plurality of rollers installed between the carrier and the rail so that the carrier can slide along the elongated rail. Yet, another prior art includes a linear guideway arrangement being provided by upper and lower guide bars held in a spaced apart parallel relationship by a series of locator blade pieces having end contours engaging the inside surfaces of the guide bars. While these devices fulfill their respective, particular objectives and requirements, the aforementioned patents do not disclose a new arrangement and method for guiding a load in a linear movement.

SUMMARY OF THE INVENTION

The general purpose of the present invention, which will be described subsequently in greater detail, is to provide a new arrangement and method for guiding a load in a linear movement which has many of the advantages of the linear guide-ways mentioned heretofore and many novel features that result in a new arrangement and method for guiding a load in a linear movement which is not anticipated, rendered obvious, suggested, or even implied by any of the prior art linear guide-ways, either alone or in any combination thereof. The present invention includes a rail being a solid body having a top and opposed sides each interconnecting the top; a shaft being movable upon the rail; and a carrier assembly being movable with the shaft upon the rail. None of the prior art includes the combination of the elements of the present invention.

There has thus been outlined, rather broadly, the more important features of the arrangement and method for guiding a load in a linear movement in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not he regarded as limiting.

It is an object of the present invention to provide a new arrangement and method for guiding a load in a linear movement which has many of the advantages of the linear guide-ways mentioned heretofore and many novel features that result in a new arrangement and method for guiding a load in a linear movement which is not anticipated, rendered obvious, suggested, or even implied by any of the prior art linear guide-ways, either alone or in any combination thereof.

Still another object of the present invention is to provide a new arrangement and method for guiding a load in a linear movement for providing stability and properties of low inertia.

Still yet another object of the present invention is to provide a new arrangement and method for guiding a load in a linear movement that has unlimited length capabilities.

Even still another object of the present invention is to provide a new arrangement and method for guiding a load in a linear movement that is compact and resistant to wear and tear.

These together with other objects of the invention, along with the various features of novelty which characterize the invention, are pointed out with particularity in the claims annexed to and forming a part of this disclosure. a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
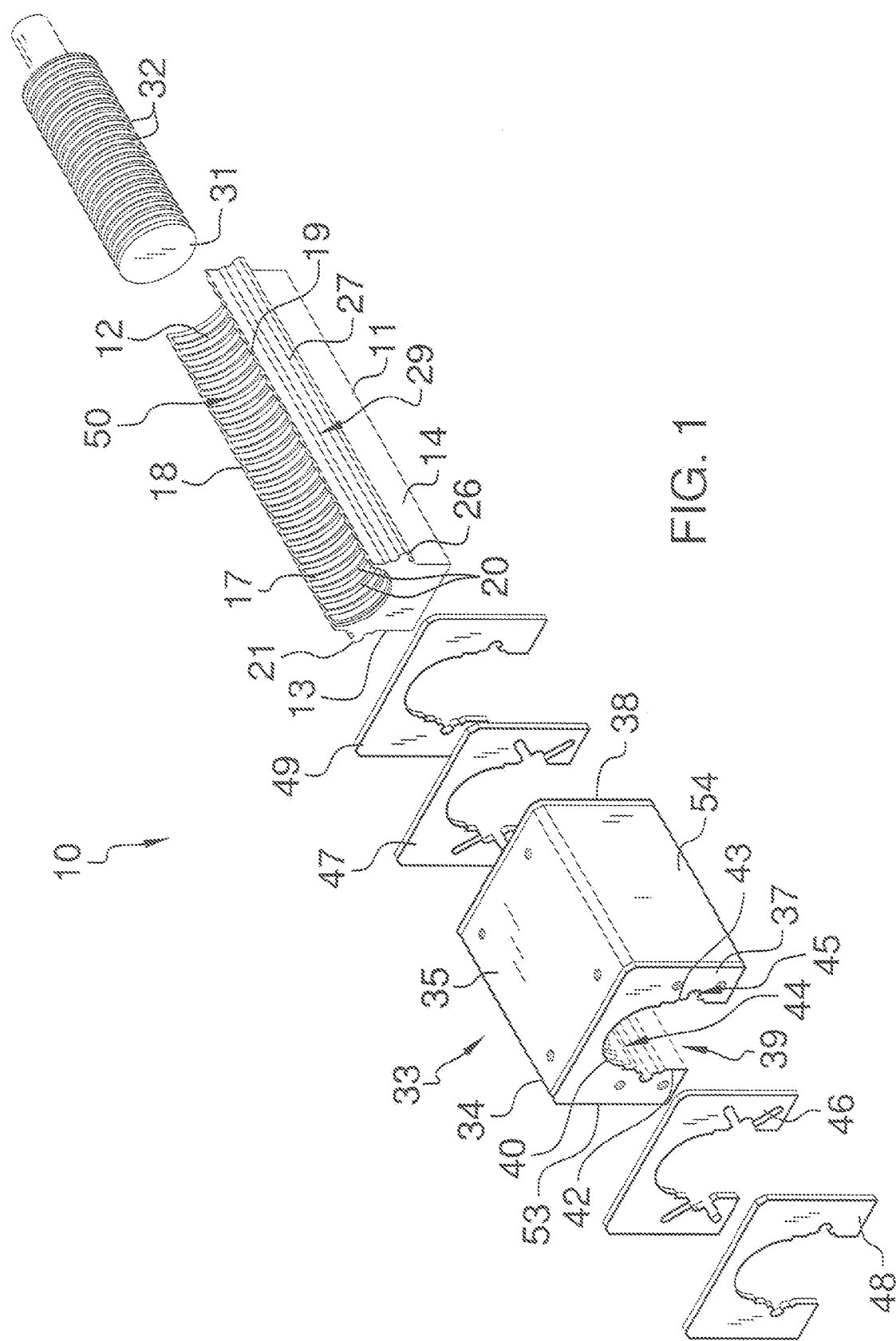
FIG. 1. is an exploded perspective view of a new arrangement and method for guiding a load in a linear movement according to the present invention.
Figure 2:
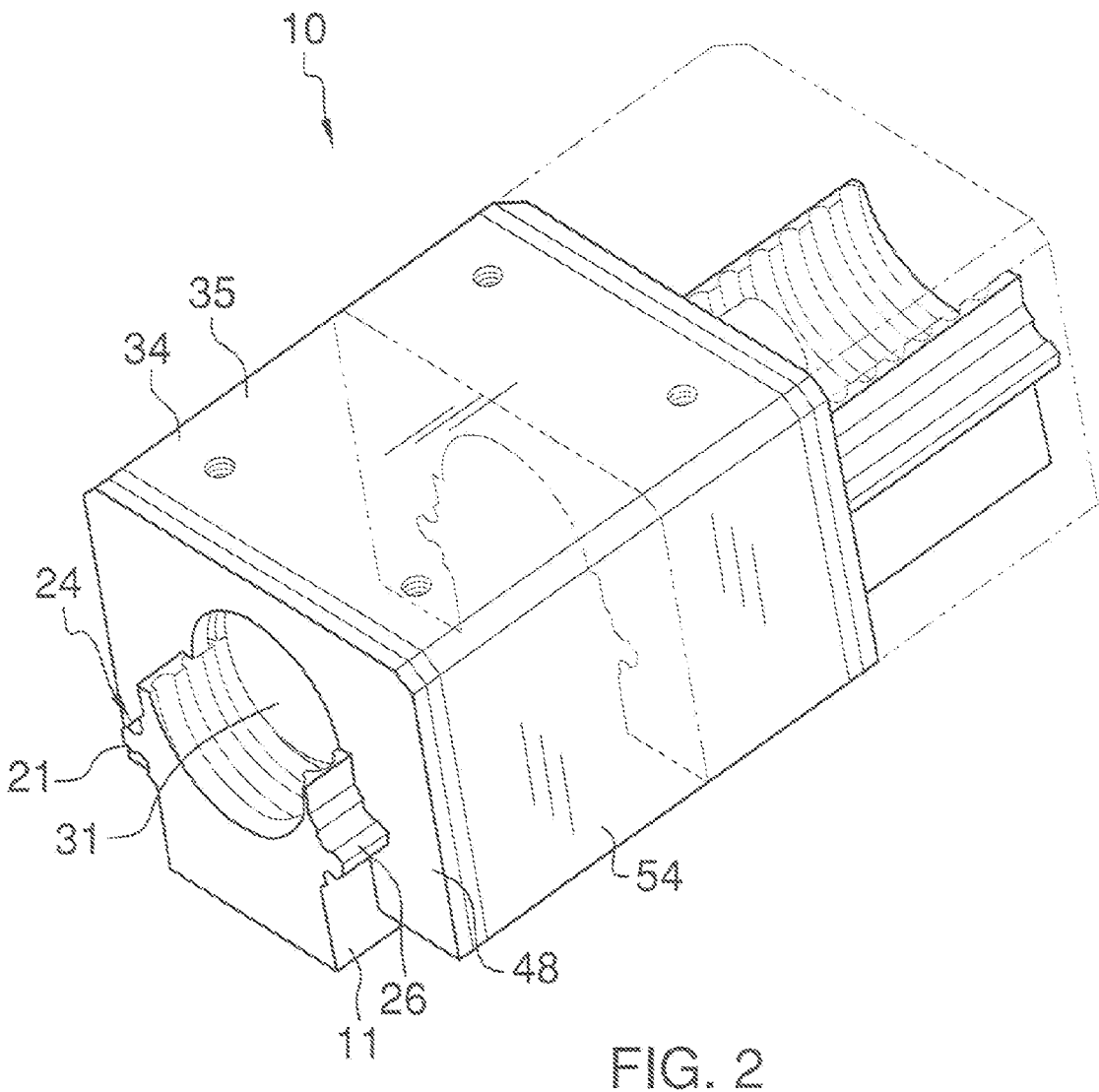
FIG. 2 is a top perspective view of the present invention.
Figure 3:
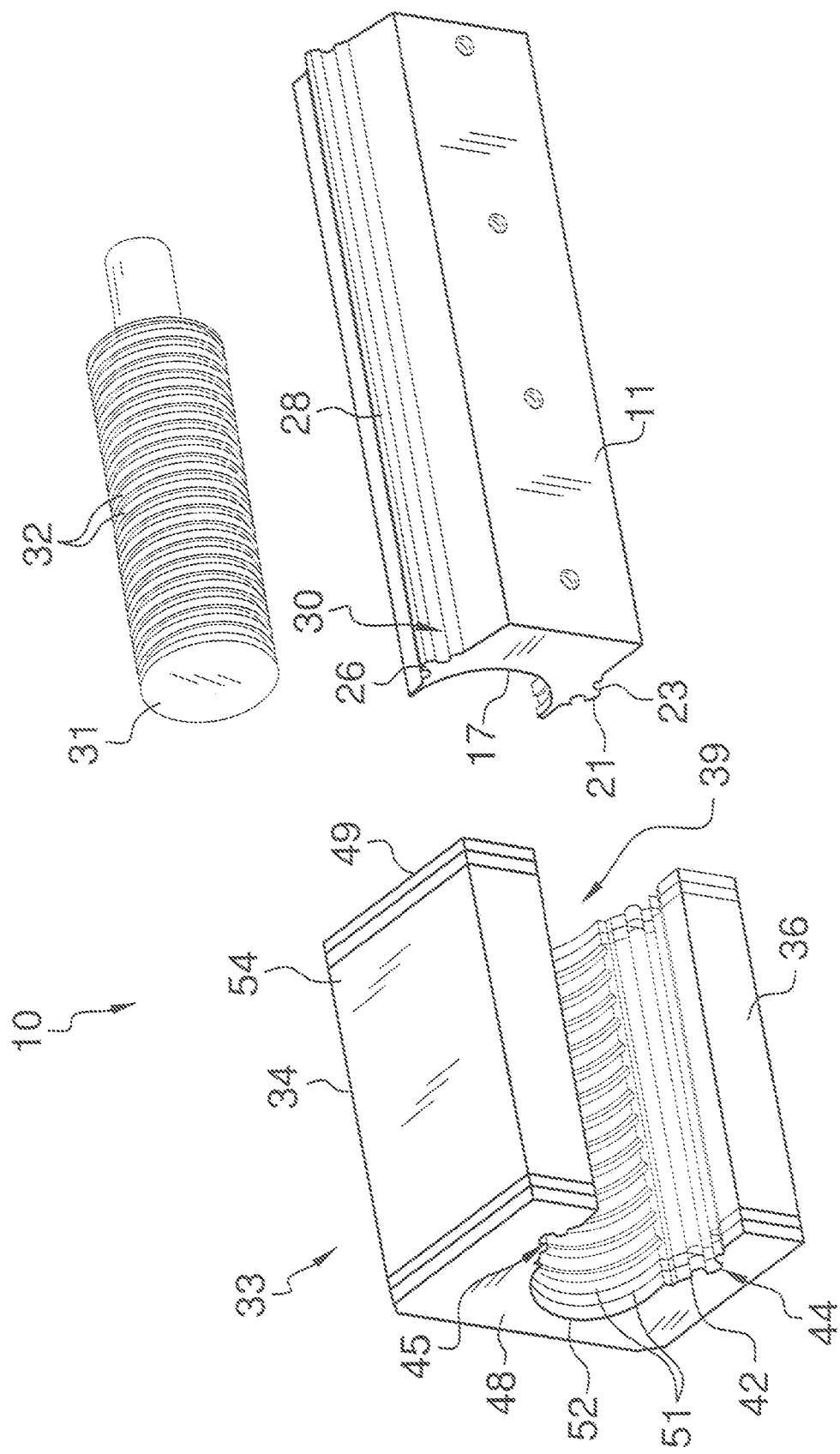
FIG. 3 is an exploded bottom perspective view of the present invention.
Figure 4:
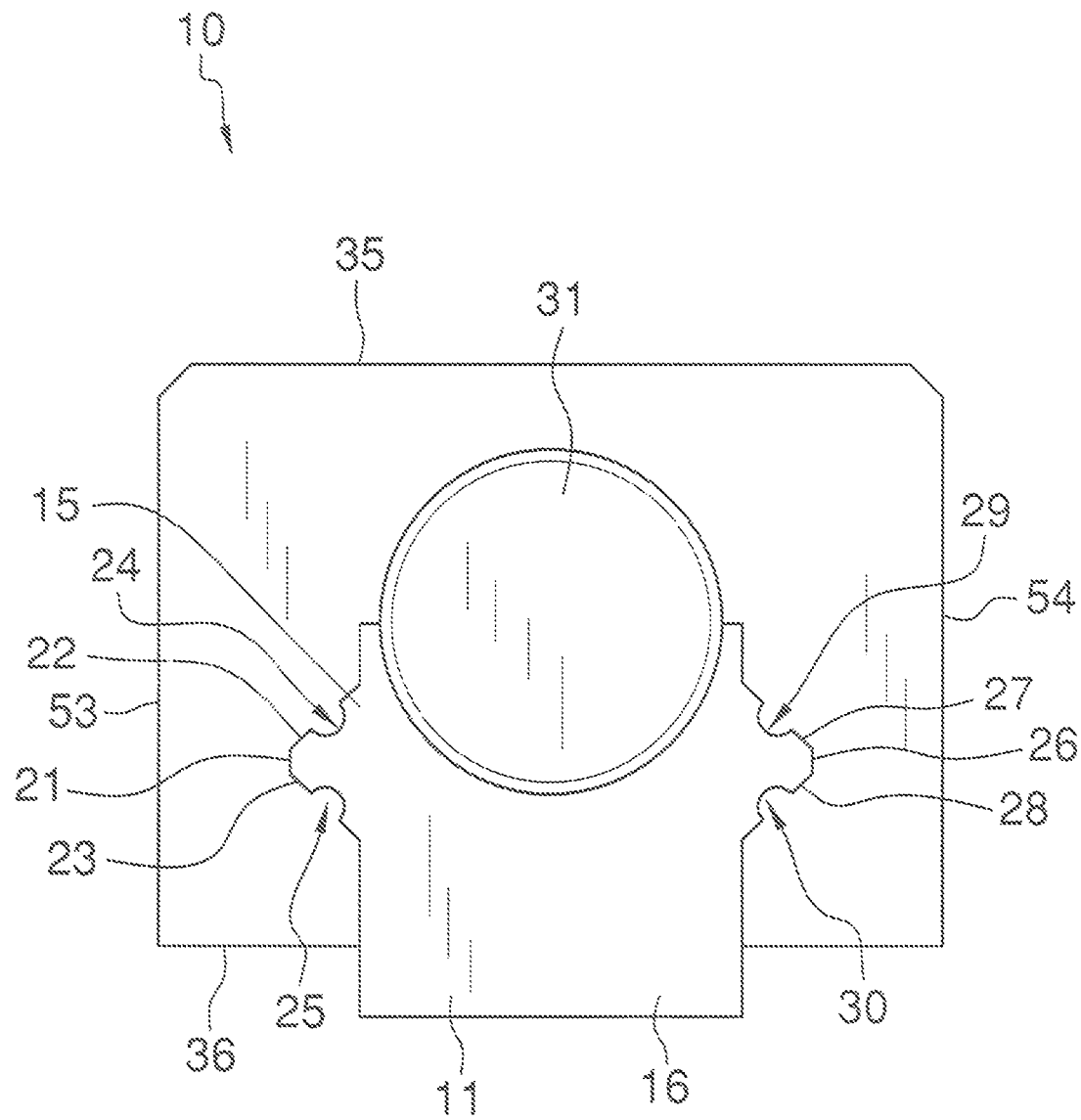
FIG. 4 is an end elevation view of the present invention.

With reference now to the drawings, and in particular to FIGS. 1 through 4 thereof, a new arrangement and method for guiding a load in a linear movement embodying the principles and concepts of the present invention and generally designated by the reference numeral 10 will be described.

As best illustrated in FIGS. 1 through 4, the arrangement and method for guiding a load in a linear movement 10 may generally comprise a rail 11 being a solid body having a top 12 and opposed sides 13,14 each interconnecting the top 12. The rail 11 includes an upper portion 15 and a lower portion 16 with a semi-cylindrical depression 50 recessed in the top 12 and extending a length of the rail 11. The semi-cylindrical depression 50 is disposed in the upper portion 15 of the rail 11. The semi-cylindrical depression 50 has a semi-cylindrical wall 17 having diametrically opposed longitudinal side edges 18,19 with threads 20 being integral to and protruding from the semi-cylindrical wall 17 and also extending laterally from one of the diametrically opposed side edges 18 to the other one of the diametrically opposed side edges 19 and extending generally perpendicular to a longitudinal axis of the semi-cylindrical depression 50 and further being spaced along the length of the semi-cylindrical wall 17 with the threads 20 being ridges. The rail 11 may also include flanges 21,26 integral to and extending from the upper portion 15 of the rail 11 and from the opposed sides 13,14 of the rail 11 and extending the Length of the rail 11. Each flange 21,26 has a top side 22,27 and a bottom side 23,28 and has grooves 24,25,29,30 disposed in the top side 22,27 and bottom side 23,28 and extending a length of the flange 21,26.

As illustrated in FIG. 1, a shaft 31 may be movable and conventionally supported upon the rail 11. The shaft 31 may have a selected length and may be received in and movable along the semi-cylindrical depression 50. The shaft 31 may include a ball screw 31 made of solid and rigid material and having external threads 32 and being threaded in and upon the semi-cylindrical depression 50 and being movable linearly along the semi-cylindrical depression 50.

As further illustrated in FIGS. 1-4, a carrier assembly 33 may be movable with the shaft 31 and conventionally supported upon the rail 31. The carder assembly 33 includes a block 34 having a top 35 and a bottom 36 and also having a cavity 39 disposed in the bottom 36 and extending a length of the block 34 through opposed ends 37,38 of the block 34 and being equidistant from sides 53,54 of the block 34. The cavity 39 has a semi-cylindrical upper portion 40 and a lower portion 41. The block 34 has threads 51 integral to and protruding from a wall 52 forming the semi-cylindrical upper portion 40. The threads 51 are ridges which extend perpendicular to a longitudinal axis extending through the opposed ends 37,38 of the block 34 and which are spaced along a length of the semi-cylindrical upper portion 40. The semi-cylindrical upper portion 40 is conventionally supported upon the ball screw 31 for movement therewith. The block 34 also includes grooves 44,45 disposed in walls 42,43 forming the lower portion 41 of the cavity 39 and arranged parallel to the top 35 of the block 34. The grooves 44,45 extend the length of the block 34 through the opposed ends 37,38. The grooves 44,45 receive the flanges 21,26 of the rail 11 to retain the block 34 to the rail 11. The cavity 39 is wider in the lower portion 41 between the wall 42,43 than in the semi-cylindrical upper portion 40. The carrier assembly 33 further includes seals 46,47 formed and conventionally secured to the opposed ends 37,38 of the block 34 and also includes seal supports 48,49 securing the seals 46,47 and being fastenable to the ends 37,38 of the block 34.

In use a load is communicated to the block 34 such that the load is conventionally supported by the block 34. The load is operationally moved with the block 34 being conventionally moved upon the rail 11 using an external force. The moving of the block 34 results in the moving of the ball screw 31 along the rail 11. The ball screw 31 is rotated relative to the rail 11 and to the block 34 with the block 34 moving with the ball screw 31 along the rail 11. The threaded cavity 39 of the block 34 urges the ball screw 31 to rotate, move and thread along the rail 11 in a linear movement.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore. the foregoing is considered as illustrative only of the principles of the arrangement and method for guiding a load in a linear movement. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An arrangement for guiding a load in a linear movement comprising:
   a rail being a solid body having a top and opposed sides each interconnecting the top, wherein the rail includes an upper portion and a lower portion with a semi-cylindrical depression recessed in the top and extending a length of the rail, wherein the semi-cylindrical depression has a semi-cylindrical wall having diametrically opposed longitudinal side edges with threads being integral to and protruding from the semi-cylindrical wall;
   a shaft being movable upon the rail; and
   a carrier assembly being movable with the shaft upon the rail wherein the rail also includes flanges integral to and extending from the upper portion of the rail; and wherein each flanges has a top side and a bottom side and has grooves disposed in the top side and bottom side and extending a length of the flange.

2. The arrangement for guiding a load in a linear movement as described in claim 1, wherein the threads extend laterally from one of the diametrically opposed side edges to the other one of the diametrically opposed side edges and extend generally perpendicular to a longitudinal axis of the semi-cylindrical depression and are spaced along the length of the semi-cylindrical wail with the threads being ridges.

3. The arrangement for guiding a load in a linear movement as described in claim 1, wherein the shaft has a selected length and is received in and movable along the semi-cylindrical depression.

4. The arrangement for guiding a load in a linear movement as described in claim 3, wherein the shaft is a ball screw made of solid and rigid material and having external threads and being threaded in and upon the semi-cylindrical depression and being movable linearly along the semi-cylindrical depression.

5. An arrangement for guiding a load in a linear movement comprising:
   a rail being a solid body having a top and opposed sides each interconnecting the top, wherein the rail includes an upper portion and lower portion with a semi-cylindrical depression recessed in the top and extending a length of the rail, wherein the rail also includes flanges integral to and extending from the upper portion of the rail; wherein each flanges has a top side and a bottom side and has grooves disposed in the top side and bottom side and extending a length of the flange a shaft being movable upon the rail; and a carrier assembly being movable with the shaft upon the rail.

6. The arrangement for guiding a load in a linear movement as described in claim 5, wherein the flanges extend outwardly from the opposed sides of the rail and extending the length of the rail.

7. The arrangement for guiding a load in a linear movement as described in claim 6, wherein the carrier assembly includes a block having a top and a bottom and also having a cavity disposed in the bottom and extending a length of the block through opposed ends of the block and being equidistant from sides of the block.

8. The arrangement for guiding a load in a linear movement as described in claim 7, wherein the cavity has a semi-cylindrical upper portion and a lower portion; wherein the block has threads integral to and protruding from a wall forming the semi-cylindrical upper portion; wherein the semi-cylindrical upper portion is supported upon the ball screw for movement therewith.

9. The arrangement for guiding a load in a linear movement as described in claim 8, wherein the threads are ridges which extend perpendicular to a longitudinal axis extending through the opposed ends of the block and which are spaced along a length of the semi-cylindrical upper portion.

10. The arrangement for guiding a load in a linear movement as described in claim 8, wherein the block also includes grooves disposed in walls forming the lower portion of the cavity and being arranged parallel to the top of the block, wherein the grooves extend the length of the block through the ends of the block, wherein the grooves receive the flanges of the rail to retain the block to the rail.

11. The arrangement for guiding a load in a linear movement as described in claim 8, wherein the cavity is wider in the lower portion between the walls of the lower portion than in the semi-cylindrical upper portion.

12. The arrangement for guiding a load in a linear movement as described in claim 7, wherein the carrier assembly further includes seals formed and secured to the opposed ends of the block and also includes seal supports securing the seals and being fastenable to the ends of the block.

\* \* \* \* \*